(12) United States Patent
Gandhi et al.

(10) Patent No.: US 7,476,408 B2
(45) Date of Patent: *Jan. 13, 2009

(54) METHOD OF PREPARING SOY MILK COMPOSITIONS

(75) Inventors: N. R. Gandhi, River Hills, WI (US); Harlan R. Hackbarth, Allenton, WI (US); Manxiang Chen, Grafton, WI (US)

(73) Assignee: Jeneil Biotech, Inc., Saukville, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/737,225

(22) Filed: Dec. 16, 2003

(65) Prior Publication Data

US 2004/0126479 A1    Jul. 1, 2004

Related U.S. Application Data

(63) Continuation of application No. 09/995,247, filed on Nov. 27, 2001, now Pat. No. 6,663,912, which is a continuation-in-part of application No. 09/410,990, filed on Oct. 1, 1999, now Pat. No. 6,322,846.

(51) Int. Cl.
*A23L 1/20* (2006.01)
(52) U.S. Cl. ...................... 426/634; 426/598
(58) Field of Classification Search ................. 426/634, 426/598
See application file for complete search history.

(56) References Cited

U.S. PATENT DOCUMENTS

| | | | |
|---|---|---|---|
| 3,642,493 A | 2/1972 | Arndt | |
| 3,897,570 A | 7/1975 | Yokotsuka et al. | |
| 3,941,890 A * | 3/1976 | Drachenberg et al. | 426/46 |
| 4,041,187 A | 8/1977 | Nelson et al. | |
| 4,119,733 A * | 10/1978 | Hsieh et al. | 426/46 |
| 4,378,376 A * | 3/1983 | Wagner et al. | 426/41 |
| 4,389,425 A * | 6/1983 | Burr, II | 426/598 |
| 4,885,178 A | 12/1989 | Emura et al. | |
| 4,906,482 A | 3/1990 | Zemel et al. | |
| 4,971,825 A | 11/1990 | Kitazume et al. | |
| 5,725,899 A | 3/1998 | Cole et al. | |
| 5,858,449 A * | 1/1999 | Crank et al. | 426/656 |
| 5,897,892 A * | 4/1999 | Jolivet et al. | 426/74 |
| 5,955,134 A | 9/1999 | Nishimura et al. | |
| 5,976,606 A * | 11/1999 | Koga et al. | 426/634 |
| 6,322,846 B1 * | 11/2001 | Gandhi et al. | 426/634 |
| 6,663,912 B2 * | 12/2003 | Gandhi et al. | 426/634 |

FOREIGN PATENT DOCUMENTS

| | | |
|---|---|---|
| CL | 31740 | 2/1980 |
| GB | 2263857 | 8/1993 |
| JP | 51-019166 | 2/1976 |
| JP | 57125668 | 8/1982 |
| JP | 58101668 | 6/1983 |
| JP | 59085253 | 5/1984 |
| JP | 60002153 | 1/1985 |
| JP | 61025458 | 2/1986 |
| JP | 61088837 | 5/1986 |
| JP | 62262961 | 11/1987 |
| JP | 63014676 | 1/1988 |
| JP | 61192258 | 8/1988 |
| JP | 63202385 | 8/1988 |
| JP | 2-76550 | * 3/1990 |
| JP | 40-207655 OA | 3/1990 |
| JP | 10084901 | 4/1998 |

OTHER PUBLICATIONS

Translated JP 51-019166.
Translated JP 40-207655 OA.
Translated portions of CL 31740.

* cited by examiner

*Primary Examiner*—Anthony Weier
(74) *Attorney, Agent, or Firm*—Reinhart Boerner Van Deuren s.c.

(57) ABSTRACT

Soy milk and beverage compositions together with methods for preparation, such compositions utilizing soy particulates of consistent micron dimension, either alone or in conjunction with high process pressures, to provide texture and taste characteristics.

7 Claims, No Drawings

METHOD OF PREPARING SOY MILK COMPOSITIONS

This application is a continuation of, and claims priority benefit from, application Ser. No. 09/995,247 filed Nov. 27, 2001, issued as U.S. Pat. No. 6,663,912 on Dec. 16, 2003, which is in turn a continuation-in-part of application Ser. No. 09/410,990 filed Oct. 1, 1999, issued as U.S. Pat. No. 6,322,846 on Nov. 27, 2001, the entirety of each is incorporated herein by reference.

FIELD OF INVENTION

This invention relates generally to soy drink compositions, and more particularly, to soy milks and beverages and related methods of preparation. The inventive compositions retain the natural components and health and nutritional benefits of soy, yet have a taste and texture similar to dairy milk.

BACKGROUND OF INVENTION

Simulated milk products utilizing vegetable materials have been known for many years. The most common vegetable material used to prepare simulated milk products is a soybean. Two of the most common simulated milk products made from soybeans are soy milk and tofu. Soy milk is a water extract of soybeans which has been found to be nutritionally comparable to cow's milk in most respects. Because soy milk does not contain lactose and has no cholesterol, it is an ideal substitute for cow's milk. Individuals who are lactose-intolerant and on restricted cholesterol intake diets can now be able to drink a product similar to milk without the adverse side effects. Additionally, soy milk is much less expensive and is a more readily available protein source for individuals in developing nations. For these reasons, it is important to solve problems pertaining to production and storage of soy milk.

Unfortunately, the present methods of making soy milk result in a less than optimal dairy milk substitute. Generally, soy milk has a clear, distinct, and unappealing flavor difference and a difference in texture that gives the soy milk a poor and unpleasant "mouthfeel." The poor mouthfeel is a result of cellulosic, proteinaceous and carbohydrate constituents of the soybean. These constituents are known by those skilled in the art as okara. Additionally, the appearance of soy milk manufactured by traditional methods is quite unlike milk in both color and degree of opacity. Dairy milk's appearance as a suspension has not been subject to accurate replication with the vegetable food materials, partially because of the high dispersability of milk solids and low dispersability of vegetable solids in water, wherein such dispersability is the ability to partially dissolve and partially suspend as tiny nonsettling particles, and partially because of the off-yellow, off-brown, or off-green color of the vegetable based liquid.

To combat some of these problems associated with duplicating dairy milk, methods of extracting a milk substitute from soybeans have been improved upon. The most common method to eliminate the adverse characteristics of simulated milk products is to remove the okara during the extraction process. The okara generally comprises approximately 35% of the whole soybean. By removing the okara, this method effectively removes substantial nutritional value from the soybean. Furthermore, the removal of the okara has created a considerable demand for waste depositories which will collect okara refuse. Because it is becoming cost prohibitive to continue removing the okara from the soybean extract and to discard the okara, this method has numerous disadvantages.

There have been attempts to eliminate the disadvantages of soy milk in comparison with dairy milk. U.S. Pat. No. 3,941,890 to Drachenberg et al. discloses a method of making soy milk that attempts to utilize the whole soybean. Under this method, it is necessary to first microwave heat the soybeans and then use enzymes and a colloid mill to provide a consistency similar to dairy milk. This method has at least three distinct disadvantages. First, this method requires the soybeans to be heated by a microwave apparatus to degrade the enzymes found in whole soybeans. Second, this method utilizes only enzymes to act upon and liquefy those constituents of soybeans known as okara. Such enzymes are expensive and require lengthy reaction times. It is well known that enzymes are extremely sensitive and any heat fluctuations or improper solution conditions can alter and adversely affect the activities of those enzymes. Because enzymes are so sensitive, this method can not reliably produce a consistent soy milk product. Lastly, the method as described by this patent requires a colloid mill to provide a consistent simulated milk product. Colloid mills are typically slow, work only at low volumes and do not consistently provide particles of desired size, the later of which is important for providing a mouthfeel similar to dairy milk.

Yet, in view of rising dairy costs, and of food shortages in parts of the world, a definite need has existed for a low-cost, highly-nutritious product that could be substituted freely for dairy milk. This needs to be accomplished without having to slowly condition people to a completely new taste and beverage appearance. Additionally, this should be accomplished by retaining the nutritional value of the whole soybean and eliminating the waste by-product created by removing the okara from the soy milk extract.

SUMMARY OF THE INVENTION

There are a considerable number of problems and deficiencies associated with soy milk compositions of the prior art and as previously prepared. There is a demonstrated need for a tasteful, satisfying drink product and method of preparation, in order to better utilize the health and nutritional benefits associated with soy foodstuffs. Accordingly, it is a primary objective of this invention to provide a soy milk composition with the same mouthfeel as dairy milk.

Another objective of this invention is to provide a soy milk composition made from whole soybeans including okara with a mouthfeel similar to dairy milk. It is an objective of this invention to accomplish these results by use of common machines and inexpensive additives used by those skilled in the dairy or simulated milk product industry.

Another objective of this invention is to provide a method of making a soy milk composition having the complete nutritional value of whole soybeans and with a mouthfeel similar to dairy milk.

Another objective of this invention is to provide a process of preparing a soy milk composition that eliminates okara waste from the soy milk extracts. This objective will provide a soy milk with whole soybean nutritional value while eliminating an equal volume of environmental waste.

It is a further objective of this invention to provide a nutritionally complete soy milk composition that costs a fraction of dairy milk yet retains the same taste and texture characteristics as dairy milk.

Accordingly, it is an object of the present invention to provide various soy milk and/or beverage compositions, thereby overcoming various deficiencies and shortcomings of the prior art, including those outlined above. It will be understood by those skilled in the art that one or more aspects of this invention can meet certain objectives, while one or more other aspects can lead to certain other objectives. Each objective may not apply equally, in all instances, to every aspect of the present invention. As such, these and other objects can be viewed in the alternative with respect to any one aspect of the present invention.

Other objects, features, benefits and advantages of the present invention will be apparent in this summary and descriptions of preferred embodiments, and will be readily apparent to those skilled in the art having the knowledge and experience in the area of soy food technology and nutrition. Such objects, features, benefits and advantages will be apparent from the above as taken in conjunction with the accompanying examples, data and all reasonable inferences to be drawn therefrom.

In part, the present invention is a process for preparing a soy beverage. The method can include (1) providing a dry ground soybean particulate, (2) incorporating either an organic or inorganic acid or an acid salt thereof, (3) adding water in an amount sufficient to provide a liquid consistency, and (4) treating the liquid at a pressure greater than about 2,000 psi. In preferred embodiments, the organic acid salt can be an alkali metal salt of citric acid, an alkaline earth metal salt of citric acid and/or combination of such salts. Favorable results can be realized if the soybean starting material is ground to a particulate dimension between less than about 10 microns to about 100 microns. Regardless, pressures heretofore unused and not contemplated by the prior art can be used to treat the resulting liquid. While pressures in excess of 22,000 psi can be used, satisfactory results are also obtained at pressures somewhat lower. In particular, treatment pressures between about 5,000 psi and about 12,000 psi are preferred. In highly preferred embodiments, beverage compositions with good taste and smooth mouthfeel can be obtained using such pressures in conjunction with particulate dimension less than about 100 microns.

The soybean material of the present invention can be obtained from a variety of soy sources well-known to those skilled in the art: including, without limitation, whole ground soybeans, soy concentrate, full fat soy meal or grits, whole soybean powder, whole or partially defatted soybean flakes or powders, defatted soybean powder, whole soybean flakes, defatted soybean flakes, whole soy flour, dehulled soybean flour, defatted soy flour—any one of which may be utilized roasted, partially roasted or completely roasted. As mentioned above, however, considerable cost savings can be realized by eliminating the need to dispose of or otherwise address okara. Accordingly, the full benefit of this invention can be realized by utilizing "whole" soybeans—all or substantially all of the proteinaceous and/or cellulosic components of the soybean material—regardless of the initial soybean material employed.

While soy particulate dimensions greater than 100 microns can be utilized, results are enhanced at dimensions less than 100 microns. With many embodiments, the preferred range is about 20 microns to about 50 microns. However, numerous soy materials can be dimensioned less than 10 microns to provide an especially smooth beverage composition. Without limitation, such materials include defatted soy flakes and/or defatted soy flour, ground as described elsewhere herein.

The methods, processes and/or compositions of the present invention can include but do not necessarily require the use of an acid and/or acid salt with the ground soy particulate. Such acids include food grade organic or inorganic acids, either alone or together with a suitable corresponding salt. Likewise, and as mentioned above in conjunction with preferred embodiments, an acid salt can be used alone to achieve comparable results. In preferred embodiments, sodium citrate, potassium citrate and/or combinations of such salts can be used either alone or in combination with citric acid. Alternatively, in accordance with this invention, other food grade salts of mono- and/or polybasic acids can be used. As separate embodiments, the present invention can include use of food grade inorganic acids, the corresponding salts and/or combinations thereof. For example, various phosphate and/or bicarbonate salts can be used satisfactorily. However, the resulting compositions prepared with such inorganic acids and/or salts are markedly improved when used in conjunction with the present process parameters, especially under the high pressure conditions described elsewhere herein.

Without restriction to any one theory or mode of operation, it can be thought that these components provide something of a buffer function under aqueous conditions. Alternatively, without limitation, such acid and/or salt components can be viewed as having a chelating effect on various soybean components, pectin in particular. This consideration may explain the marked improvement in compositional qualities observed with a citrate component over, for instance, a phosphate component. Regardless, such components, when used as described, provide a soy base which can be used without removal of the indigenous or naturally occurring proteinaceous and/or cellulosic material.

The concentration of such acids, acid salts and/or buffer components can vary depending upon the amount, identity and/or dimension of the soy particulate. Useful concentrations typically range from about 0.1 to about 3.0%, although most formulations of this invention can be prepared using salt concentrations between about 0.3 and about 0.6%.

Preferred embodiments of the present invention can include introduction or use of calcium ion. Again, without restriction to any one theory or mode of operation, it is believed that a source of calcium ion adds body, consistency and an extra texture to the resulting milk or beverage composition. Various sources of food grade calcium will be well-known to those skilled in the art made aware of this invention. However and without limitation, both calcium sulfate and the corresponding phosphate can be used with good effect.

The method or process of this invention can be used to control the fat or oil content of the resulting milk or beverage composition. As mentioned above, the various soy materials can be used either completely or partially defatted. Alternatively, the fat/oil component of the resulting milk or beverage composition can be augmented through proper selection of a desired vegetable oil, vegetable fat, animal fat and/or combination thereof. As would be well-known to those skilled in the art, any commercially-available oil, fat or combination can be used. Corn and canola oil are preferred for certain compositions, while dairy fats—including without limitation cream or butter—can be used with certain other compositions. A fat/oil component can also be provided by blending the resulting composition with an appropriate animal and/or cereal milk. For example, numerous compositions, such as those described below, can be blended with cow milk, goat milk and/or rice milk. Even so, the fat/oil content indigenous to a given soybean material can suffice, without resort to an additional source of fat or oil.

Extraneous protein sources can be used to supplement or otherwise fortify the inventive compositions. As described in several examples and as would be well-known to those skilled in the art, soy protein isolates can be incorporated with a ground soy material or as otherwise suitable during preparation. Likewise, the present methods and compositions include incorporation of wholly or partially hydrolyzed proteins, including but not limited to those of vegetable (e.g., soy, wheat, pea, cottonseed, etc.) origin. Such hydrolyzed proteins can provide nutritional fortification and, for certain individuals, better digestion and absorption. Regardless, use thereof can be used to increase the protein level of the resulting composition without adversely affecting viscosity and thickness. Other food grade proteins—whether or not hydrolyzed—can be used as well, and include casein, whey and other dairy or milk proteins or concentrates thereof.

Recently approved federal regulations provide minimum requirements to meet the definition of a "heart healthy" soy milk or beverage. Such compositions will have a minimal protein concentration of 6.25 grams per 8 oz. serving, are part of one present invention and can be prepared using the methods herein. For example, the heart healthy compositions will also have a maximum fat content of 1.2%. The difficulty arises in that the fat/oil component of whole soybean totals about 1.8%. Less soybean can be used, but at the expense of nutritional value. The methods of this invention enable use of defatted soy materials, as well as extraneous protein sources, to meet regulatory requirements and still provide a product with desired taste and texture characteristics.

Various degradative enzymes can, optionally, be used as needed depending upon the particular soy material chosen. Such enzymes include, without limitation, pectinase, amylase, cellulase and hemi-cellulase. Likewise, various proteolytic enzymes can also be used, either alone or in combination with other such materials. The concentrations of any such enzyme will vary depending upon the texture, consistency and/or the degree of degradation desired, but can be determined in a straightforward fashion based on the amount of soy material present.

Generally, the non-enzymatic methods of this invention utilize temperatures up to about 100 C, preferably between 90 and 95 C. Treatment of the soy component at such temperature destroys the trypsin inhibitors responsible for retardation of human growth. Treatment at such temperatures also destroys the lipoxygenase enzyme system responsible for the characteristic beany taste of most soybean products. However, the degradative enzymatic activity described above requires lower process temperatures. Depending upon the particular enzyme, temperatures below 60 C are satisfactory. A suitable increase in temperature can then be used to deactivate the enzyme(s) and trypsin inhibitors after obtaining the desired degree of degradation and texture characteristics.

In part, the present invention is also a soy drink composition. Such a composition includes a whole soybean component dimension less than about 10-30 microns, and water in an amount sufficient to provide the component a liquid consistency. The micron dimensions of the soybean component are more consistently and considerably less than those attainable through traditional colloid milling processes, and provide taste and texture qualities which are both surprising and unexpected given the prior art. Such dimensions are preferably less than 4 microns and can be achieved through proper selection and processing of a soybean material. A dry soy material is initially micro-ground to 10-30 microns, blended with water with, preferably, incorporation of a food grade buffer component, then homogenized under the high pressures illustrated herein. Such buffers can include, without limitation, the organic acid salts described more fully above. As would be well-known to those skilled in the art, a soy drink, made in accordance with this invention, can be defined as either a milk or beverage, depending upon regulatory jurisdiction, statutory definition or the presence and/or concentration of any one additive or component.

A soy drink composition in accordance with this invention, or any composition of the sort described herein, can be dehydrated for later reconstitution in water. This shelf-stable embodiment is light-weight, compact and lowers shipping costs. Traditional spray-drying equipment with a high-pressure homogenizer can be employed, as can other methods and techniques well known to those skilled in the art and designed to provide the same or similar result.

In addition to providing a preferred compositional embodiment, spray-drying can be used effectively to assist in reduction of particulate dimension and the improvement of textural characteristics. For example, a liquefied soy base can be prepared as otherwise described herein, then spray-dried with high pressure treatment. Spray-drying further reduces the initial particulate dimension of the soy material. The reconstituted composition can then be homogenized under the lower pressures of the prior art. Texture, consistency and taste characteristics are comparable to those compositions otherwise prepared under the high pressure conditions described above.

EXAMPLES OF THE INVENTION

The following non-limiting examples and data illustrate various aspects and features relating to the compositions and methods of this invention. Such aspects and features include the surprising and unexpected results obtained using dry ground soybean particulates; in particular, the smooth mouthfeel and taste characteristics achieved using components and/or process parameters otherwise not contemplated or thought not possible. It should, of course, be understood that these examples are included for illustrative purpose only and that the invention is not limited to the particular combinations of materials, conditions, properties or the like set forth herein. Comparable utility and advantages can be realized using various other methodologies and/or compositional embodiments consistent with the scope of this invention.

Equipment to make and use the present invention will be well-known to those skilled in the art. However, it has been found that especially good results can be obtained using a micro-grinding mill available from Buehler, Ltd. of Uzwil, Switzerland. Likewise, various commercially-available one- or two-stage high pressure homogenizers can be used in accordance with the present invention; one such homogenizer is available from either the Rannie or Gaulian divisions of APV, of Wilmington, Mass.

All components and/or ingredients used in conjunction with the present invention are commercially available from sources well-known to those skilled in the art. Likewise, the various process parameters described herein can be readily modified by such individuals to account for variations in the identity or concentration of such components and ingredients or as required to achieve results in accordance with those described herein.

Example 1

One hundred and twenty grams of fine ground dehulled whole soybean flour was blended with 10 grams of sodium citrate. This soy powder blend was blended with 1,870 ml of hot water at 95 C. The powder was blended for about 15 minutes with water temperature maintained between 90 and 95 C. After 15 minutes a chocolate flavoring (1%) was mixed with the liquid. The resulting mixture was homogenized in a two stage homogenizer. First stage pressure was maintained approximately at about 5,000-7,000 psi and the second stage at 1,500 psi. The soy beverage of this example did not give any gritty, sandy or powdery mouthfeel during sensory evaluation.

The flour material of this example can be ground to particulates dimensioned less than 30 microns, and pressures of 20,000 psi can be used during the first stage.

Example 2

One hundred and twenty grams of fine ground dehulled whole soybean flour was blended with 5 grams of sodium citrate and 5 grams of potassium citrate, then together blended with 1870 ml of hot water at 95 C. The powder was blended for about 15 minutes, and the blending water temperature was maintained between 90 and 95 C. After 15 minutes, a fruit flavoring was mixed with the liquid. The resulting mixture was homogenized in a two stage homogenizer. First stage pressure was preferably maintained at approximately 5,000-7,000 psi and the second stage at 1,500 psi. Again, the high pressure reduces particle size and provides a soy milk without a gritty, sandy or powdery mouthfeel.

The soy material of this example can be substituted using defatted soy flakes. Preferably such flakes are ground to less than about 5 microns. Alternatively, a one-stage homogenizer can be used at pressures in accordance with this invention. Regardless, pressures up to about 20,000 psi can be employed.

Example 3

One hundred and sixty grams of fine ground dehulled whole soybean flour was blended with 10 grams of sodium citrate, and together blended with 1870 ml of hot water at 95 C. Mixing parameters were as described in Example 2. After 15 minutes flavoring (1%) was mixed with the liquid. The resulting mixture was homogenized in a two stage homogenizer. First stage pressure was maintained approximately 5,000-7,000 psi and the second stage at 1,500 psi.

Alternatively, the method of this and other examples can employ reversed pressures; that is, a first stage at 1,500 psi. As described elsewhere herein a second stage pressure of about 20,000 psi also can be used.

Example 4

Two hundred and twenty five grams of fine ground dehulled whole soybean flour was blended with 15 grams of sodium citrate, then together blended with 2760 ml of hot water at 95 C. After mixing, a vanilla flavoring was mixed with the liquid. The resulting mixture was homogenized in a two stage homogenizer. First stage pressure was maintained approximately 8,000 psi and the second stage at 1,500 psi. (Optionally, various dairy flavorings can otherwise be introduced). The resulting soy drink was blended with cow's milk containing 2% fat in the following manner.

| Soy milk | 250 grams | 300 grams | 350 grams | 400 grams | 450 grams |
|---|---|---|---|---|---|
| Cow's milk | 250 grams | 200 grams | 150 grams | 100 grams | 050 grams |

The method of this example can be modified to provide the citrate component as an aqueous solution or incorporated as a solid directly into the water blend, and/or as mixture of citric acid and a conjugate base salt.

Example 5

One hundred and twenty five grams of fine ground dehulled whole soybean flour was blended with 100 grams of defatted soybean flour and 15 grams of sodium citrate. This soy powder blend was blended with 2760 ml of hot water at 95 C. After mixing at such temperatures the liquid was divided in three equal portions. Each portion was mixed with vegetable oil (Canola Oil) in the following manner.

| Soy milk | 1000 grams | 990 grams | 985 grams |
|---|---|---|---|
| Canola Oil | — | 10 grams | 15 grams |

After mixing with oil, flavoring (1%) was mixed with the liquid. The resulting mixture was homogenized in a two stage homogenizer. First stage pressure was maintained approximately 10,000 psi and the second stage at 1,500 psi.

No flavor or oil component is required, as the composition of this example provides good taste and texture characteristics. However, a suitable fruit flavor component can be introduced using whole fruit, fruit juice, powder, concentrate, puree or combinations thereof. Likewise, as would be understood by those skilled in the art, various masking flavors can be used with good effect.

Example 6

One hundred grams of fine ground dehulled whole soybean flour and 55 grams of soy protein isolates was blended with 5 grams of sodium citrate and 5 grams of potassium citrate. This soy powder blend was mixed with 1885 ml of hot water at 95 C. After 15 minutes, flavoring (1%) was mixed with the liquid. The resulting mixture was homogenized in a two stage homogenizer. First stage pressure was maintained approximately 8,000 psi and the second stage at 1,500 psi.

This soy milk contains a higher amount of protein and lower amount of fat than regular soy milk, and is of the type contemplated for the above-referenced "heart healthy" designation. Further reductions in fat content can be achieved by using defatted soy flour.

Example 7

One hundred grams of fine ground dehulled whole soybean flour and 55 grams of soy protein isolates was blended with 5 grams of sodium citrate, 5 grams of potassium citrate and 0.5 gram of carragenan as stabilizer. This soy powder blend was mixed with 1885 ml of hot water at 95 C and maintained between 90 and 95 C with mixing at 90 to 95 C for 15 minutes. After 15 minutes flavoring (1%) was mixed with the liquid. The resulting mixture was homogenized in a two stage homogenizer using pressures in accordance with this invention.

This soy milk also contains a higher amount of protein and lower amount of fat than regular soy milk. While carragenan, xanthum, locust bean and guar gum and other such stabilizers, suspension agents and emulsifiers known in the art can be used to improve mouthfeel, texture and consistency. Where such an agent is desired, for the purpose of illustration, lecithin can be used in amounts approximating about 0.01 weight present to about 0.5 weight percent, preferably about 0.02-0.04, of the resulting composition.

Example 8

One hundred grams of fine ground dehulled whole soybean flour and 55 grams of soy protein isolates was blended with 5 grams of sodium citrate, 5 grams of potassium citrate and 2.0 grams of Xanthan gum as stabilizer. This soy powder blend was mixed with 1885 ml of hot water at 95 C, and maintained between 90 and 95 C, with mixing at 90 to 95 C for 15 minutes. After 15 minutes flavoring (1%) was mixed with the liquid. The resulting mixture was homogenized in a two stage homogenizer. First stage pressure was maintained approximately 8,000 psi and the second stage at 1,500 psi.

This soy milk contains a higher amount of protein and lower amount of fat than regular soy milk. With proper soy sizing and selection of pressure treatment, the composition of this example can have a particulate dimension of less than 20 microns, preferably less than 4 microns.

Example 9

One hundred grams of fine ground dehulled whole soybean flour and 55 grams of soy protein isolates was blended with 5 grams of sodium citrate, 5 grams of potassium citrate, 0.5 grams of carragenan as stabilizer and 5 grams of tricalcium phosphate. This soy powder blend was mixed with 1885 ml of hot water at 95 C, and maintained between 90 and 95 C, with mixing at 90 to 95 C for 15 minutes. After 15 minutes flavoring (1%) was mixed with the liquid. The resulting mixture was homogenized in a two stage homogenizer. First stage pressure was maintained approximately 8,000 psi and the second stage at 1,500 psi.

This soy drink composition also contains a higher amount of protein and lower amount of fat than regular soy milk. Calcium ion can also be introduced using other food grade salts, such as calcium sulfate.

Example 10

One hundred and twenty grams of fine ground dehulled whole soybean flour was blended with 10 grams of sodium citrate. This soy powder blend was mixed with 1870 ml of hot water at 50 C, and maintained between 50 and 55 C. After blending the mixture was treated for about one hour with an enzyme combination of cellulase, hemi-cellulase and pectinase. After one hour flavoring (1%) was mixed with the liquid. The resulting mixture was homogenized in a two stage homogenizer. First stage pressure was maintained approximately 6,000 psi and the second stage at 1,500 psi. As shown by the method and resulting composition of this example, reduced process temperatures facilitate enzymatic activity. Raising temperatures to about 95 C to about 100 C for about 10-15 minutes can then deactivate the enzymes and trypsin inhibitors and control the amount of degradation desired and the resulting composition texture.

The composition of this example can be prepared using an inorganic acid, salt or combination thereof, such as a phosphate buffer system, alone or in combination with a corresponding citrate system.

Example 11

Dry soybean particulate in the form of fine ground dehulled soybean flour with a dry weight of 125 grams is blended with 10 grams dry weight of sodium citrate. The soybean base is mixed into 1.87 L. of water with a temperature of 95 C. The soy mixture is agitated for a period of no less than 15 minutes at a temperature range between 90 and 95 C. The soy mixture is then homogenized in one stage at a pressure of about 5,000-20,000 psi. The soy beverage resulting from this process has particulate matter with a size less than 10 microns providing smooth consistency without any gritty, sandy or powdery mouthfeel during sensory evaluation.

Example 12

The soy mixture of Example 1 is homogenized in a two-stage homogenizer. In different aliquots, the soy mixture can be homogenized in the first step at pressures 6,000-12,000 psi. The second pressure stage is maintained at 1,500 psi. Alternatively, the composition can be prepared with a one-stage pressure of 6,000-12,000 psi.

Example 13

With reference to Example 11 or 12, canola oil is added to comprise the following percentages of total volume prior to homogenization: 1% canola oil and 2.0% canola oil.

Example 14

With reference to Example 13, one of the following fat/oil components can be substituted for canola oil: coconut oil, safflower oil, soybean oil, sunflower oil, palm oil, coconut oil, or a combination thereof and as can be suitably hydrogenated.

Example 15

With reference to any of the examples herein, food grade calcium is added to the soy milk or beverage, to increase the body and texture thereof and providing a more desirable mouthfeel. As applicable to any of the previous examples, this composition can be prepared substituting soy meal and/or grits with the appropriate modification related process parameters.

Example 16

With reference to Examples 1-11, after mixing the soybean base with water and homogenization, the resulting soy milk or beverage is pasteurized by methods commonly known in the industry, including ultra high temperature pasteurization at approximately 150 C for 1 to 2 seconds.

Example 17

A soy beverage formulated as described in any of the preceding examples can be blended with the following liquid components which can comprise about 10% to about 50% of the total volume of the soy beverage: animal milk, cereal milk and combinations thereof.

Example 18

The starting material is dry, fine ground, dehulled soybean flour having a particle size less than 100 microns, and the steps of Example 2 are followed except temperatures are maintained for 30 minutes. Prior to homogenization, 1% milk flavoring is added to the soy mixture. The soy mixture is then homogenized in a two-step process. The first step is at a pressure of approximately 8,000 psi. The second pressure is at approximately 1,500 psi. The soy beverage resulting from homogenization is then pasteurized by methods commonly known to those skilled in the art. The flavoring component of this example can be one or more of several commonly used in animal or cereal milks/beverages, including without limitation, chocolate, vanilla and various fruit flavorings. Such flavor components can be obtained from Jeneil Biotech Inc., of Saukville, Wis.

Example 19

Using whole soybean flour, a drink composition was prepared consistent with the methodologies described herein, then examined under 1000× magnification using a phase-contrast Litz microscope. A characteristically and compositionally significant percentage of the particles observed are dimensioned less than about 1.5 microns. Other soybean materials can be used, in accordance with this invention, to provide comparable results as can be verified both microscopically and by sensory evaluation.

While the principles of this invention had been described in connection with specific embodiments, it should be understood clearly that these descriptions, along with the chosen representative compositions and methods, together with the corresponding data, are made only by way of example and are not intended to limit the scope of this invention in any manner. For instance, the soy compositions of this invention are not limited to any one definition of milk or beverage. Other advantages and futures of this invention will become apparent from the following claims, with the scope thereof determined by the reasonable equivalents, as understood by those skilled in the art.

What is claimed:

1. A process for preparing a soy composition, said process comprising:
    providing a ground soybean particulate comprising whole soybean material;
    adding water to said particulate in an amount sufficient to provide liquid consistency;
    incorporating a food grade buffer component;
    heating said liquid at a temperature between about 90° C. and abut 95° C.; and
    treating said liquid at a pressure greater than about 2,000 psi.

2. The process of claim 1, wherein said buffer component includes at least one of an acid and an acid salt, wherein said salt is the salt of an organic acid selected from the group consisting of alkali metal and alkaline earth metal salts of citric acid and combinations of said metal salts.

3. The process of claim 1, further comprising adding at least one of a fat and an oil component selected from the group consisting of animal fats, vegetable oils, vegetable fats and combinations thereof.

4. The process of claim 1, further comprising adding an extraneous milk additive, said additive selected from the group consisting of an animal milk, cereal milk and combinations thereof.

5. The process of claim 1, wherein said soybean component in the soybean composition is dimensioned less than about 4 microns.

6. The process of claim 1, further comprising drying said composition to a powder.

7. A non-enzymatic process for preparing a soy composition, said process comprising:
    providing a whole ground soybean particulate;
    adding water to said particulate in an amount sufficient to provide liquid consistency;
    heating said liquid at a temperature between about 90° C. and about 95° C.; and
    treating said liquid at a pressure greater than about 2,000 psi, wherein the size of the whole ground soybean particulate in the soy composition is about 30 microns or less.

* * * * *